US008756052B2

(12) United States Patent
Walker et al.

(10) Patent No.: US 8,756,052 B2
(45) Date of Patent: Jun. 17, 2014

(54) METHODS AND SYSTEMS FOR A LOCALLY AND TEMPORALLY ADAPTIVE TEXT PREDICTION

(75) Inventors: David Ryan Walker, Waterloo (CA); Jerome Pasquero, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 13/460,799

(22) Filed: Apr. 30, 2012

(65) Prior Publication Data

US 2013/0289976 A1 Oct. 31, 2013

(51) Int. Cl.
*G06F 17/27* (2006.01)

(52) U.S. Cl.
USPC ............... 704/9; 715/863; 715/816; 715/700; 715/261; 715/259; 709/206; 709/224; 704/270; 704/260; 704/235; 375/357

(58) Field of Classification Search
USPC ............. 704/9, 270, 260, 235; 715/863, 816, 715/700, 261, 259; 709/224, 206; 375/357
See application file for complete search history.

(56) References Cited

U.S. PATENT DOCUMENTS

| | | | | |
|---|---|---|---|---|
| 5,610,983 A * | 3/1997 | Stewart | ......................... | 375/357 |
| 5,873,107 A | 2/1999 | Borovoy et al. | | |
| 7,023,979 B1 * | 4/2006 | Wu et al. | ................. | 379/265.11 |
| 7,774,334 B2 | 8/2010 | Thorn | | |
| 8,060,841 B2 * | 11/2011 | Boillot et al. | ................. | 715/863 |
| 8,209,183 B1 * | 6/2012 | Patel et al. | .................... | 704/270 |
| 8,213,417 B2 * | 7/2012 | Hernandez-Mondragon et al. | ............................. | 370/352 |
| 8,452,479 B2 * | 5/2013 | Nath et al. | .................... | 701/29.4 |
| 8,564,544 B2 * | 10/2013 | Jobs et al. | ...................... | 345/173 |
| 2005/0188330 A1 | 8/2005 | Griffin | | |
| 2005/0283724 A1 | 12/2005 | Griffin | | |
| 2005/0283725 A1 * | 12/2005 | Griffin et al. | .................. | 715/532 |
| 2006/0098899 A1 * | 5/2006 | King et al. | ..................... | 382/305 |
| 2006/0156233 A1 * | 7/2006 | Nurmi | ......................... | 715/532 |
| 2006/0217144 A1 * | 9/2006 | Bonnelykke Kristensen et al. | ........................... | 455/550.1 |
| 2006/0230350 A1 * | 10/2006 | Baluja | .......................... | 715/700 |
| 2007/0061363 A1 | 3/2007 | Ramer et al. | | |
| 2007/0094029 A1 * | 4/2007 | Saito et al. | ..................... | 704/260 |
| 2008/0243736 A1 | 10/2008 | Rieman | | |
| 2008/0243834 A1 * | 10/2008 | Rieman et al. | ..................... | 707/5 |
| 2008/0313182 A1 * | 12/2008 | Vasa | .................................. | 707/6 |
| 2008/0319737 A1 * | 12/2008 | Dariel | .............................. | 704/9 |
| 2008/0320411 A1 | 12/2008 | Chen et al. | | |
| 2009/0106695 A1 * | 4/2009 | Perry et al. | ..................... | 715/816 |

(Continued)

FOREIGN PATENT DOCUMENTS

| | | |
|---|---|---|
| CN | 101847159 A | 9/2010 |
| GB | 2470585 A | 12/2010 |
| WO | 20100045549 | 4/2010 |

OTHER PUBLICATIONS

PCT Notification of Transmittal of the International Search Report and the Written Opinion of the International Searching Authority for International Application No. PCT/CA2012/000402 dated Jan. 25, 2013, 4 pages.

(Continued)

*Primary Examiner* — Michael Colucci
(74) *Attorney, Agent, or Firm* — Finnegan, Henderson, Farabow, Garrett & Dunner, LLP (57) ABSTRACT

An electronic device is provided, having a locally and temporally adaptive prediction database.

16 Claims, 8 Drawing Sheets

(56) References Cited

U.S. PATENT DOCUMENTS

| | | | |
|---|---|---|---|
| 2009/0306969 A1 | 12/2009 | Goud et al. | |
| 2010/0161733 A1* | 6/2010 | Bower et al. | 709/206 |
| 2010/0169436 A1* | 7/2010 | Graham et al. | 709/206 |
| 2011/0004849 A1* | 1/2011 | Oh | 715/816 |
| 2011/0078563 A1* | 3/2011 | Archer | 715/261 |
| 2011/0246575 A1 | 10/2011 | Murayama | |
| 2012/0054337 A1* | 3/2012 | Moritz et al. | 709/224 |
| 2012/0253802 A1* | 10/2012 | Heck et al. | 704/235 |

OTHER PUBLICATIONS

Communication from the European Patent Office enclosing the Extended European Search Report for European Application No. 12166120.1, dated Sep. 6, 2012 (9 pages).

European Examination Report dated Feb. 5, 2014, issued in European Application No. 12166120.1 (6 pages).

* cited by examiner

| 404 | 406 | 408 |
|---|---|---|
| bear | 10 | |
| beer | 10 | |
| ... | ... | ... |
| car | 10 | |
| ... | ... | ... |
| ear | 10 | |
| Earl | 15 | |
| early | 10 | |
| early bird | 5 | |
| earth | 10 | |
| earthquake | 148 | |
| earth day 2012 | 33 | temp |
| ... | ... | ... |

METHODS AND SYSTEMS FOR A LOCALLY AND TEMPORALLY ADAPTIVE TEXT PREDICTION

FIELD OF TECHNOLOGY

The present disclosure relates to electronic devices including, but not limited to, electronic devices and their control.

BACKGROUND

Electronic devices have gained widespread use and provide a variety of functions including, for example, telephony, text messaging, web browsing, or other personal information manager (PIM) functions such as a calendar application. Electronic devices include several types of devices such as cellular telephones (mobile phones), smart telephones (smart phones), Personal Digital Assistants (PDAs), tablet computers, laptop or desktop computers, with wireless network communications or near-field communications connectivity such as Bluetooth® capabilities.

Electronic devices such as smart phones, tablet computers, or PDAs are generally intended for handheld use due to their small size and ease of portability. A touch-sensitive input device, such as a touchscreen display, is desirable on handheld devices, which are small and may have limited space for user input or output devices. Improvements in electronic devices with displays are desirable.

BRIEF DESCRIPTION OF THE DRAWINGS

Embodiments of the present disclosure will now be described, by way of example only, with reference to the attached Figures, wherein.

DETAILED DESCRIPTION

The present disclosure describes a method of predicting an input object in a first electronic device that is coupled to a prediction database comprising a plurality of prediction objects. The method includes receiving, by a second electronic device, a second text object, determining whether the first electronic device is associated with the second electronic device based on location, if the first electronic device is associated with the second electronic device, updating the prediction database based on the second text object. The method also includes receiving, by the first electronic device, a first text object, selecting, by the first electronic device, an output text object from the plurality of prediction objects, and outputting, by the first electronic device, the output text object selected from the plurality of prediction objects.

For simplicity and clarity of illustration, reference numerals may be repeated among the figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described herein. The description is not to be considered as limited to the scope of the example embodiments described herein.

The present disclosure generally relates to an electronic device, such as a portable electronic device. Examples of portable electronic devices include wireless communication devices such as cellular telephones (mobile phones), smart telephones (smart phones), pagers, PDAs, tablet computers, laptop computers, notebook computers, netbook computers, and so forth, with wireless or wired communications capabilities.

Increasingly, electronic devices are capable of assisting a user in the task of inputting text into applications by predicting what the user will type and automatically completing and/or correcting the input text based on that prediction. Basic text prediction solutions have been introduced, but they can be limited to comparisons with static, global dictionaries, and are unable to quickly adapt to a fast-changing environment in which users find themselves today. Accordingly, example embodiments described herein disclose text prediction systems and methods that are quickly adaptable to reflect current and local events.

Figure 1:
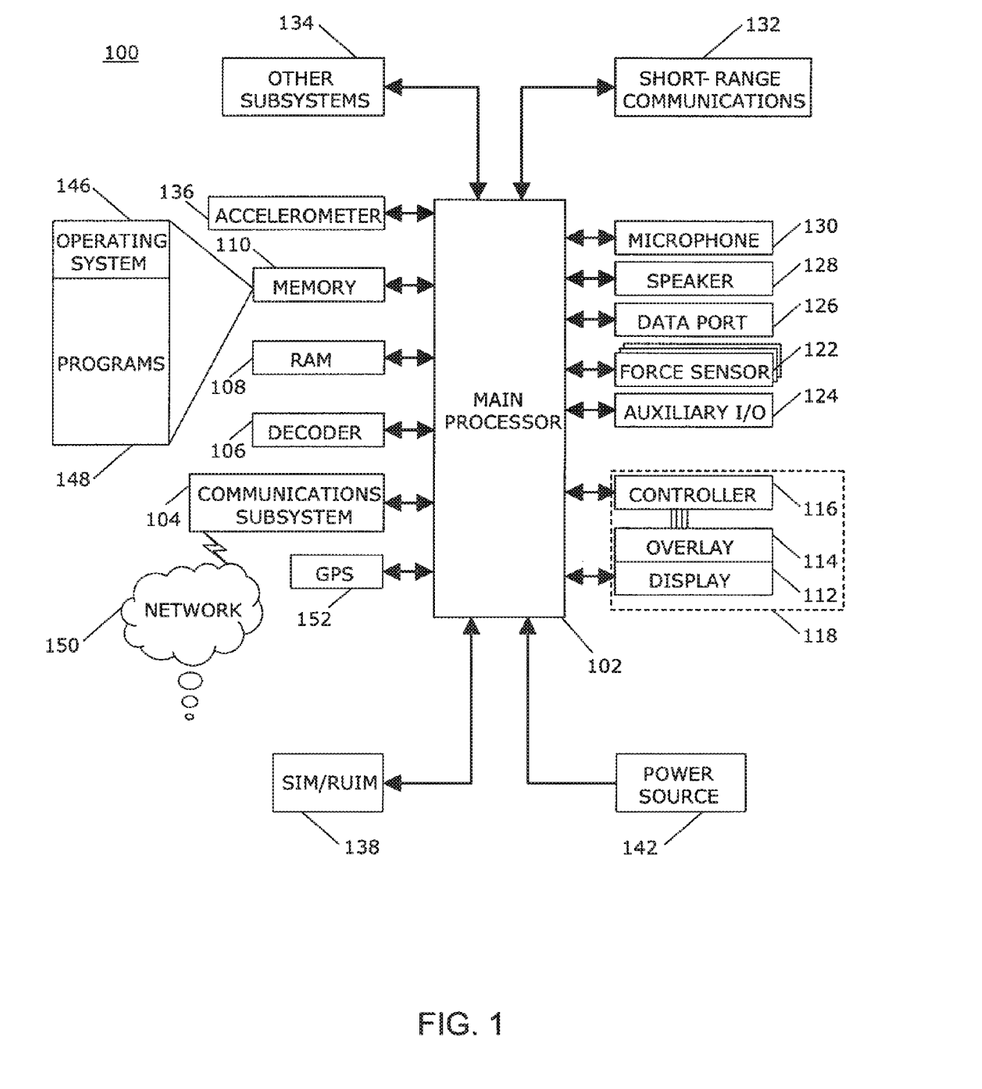
FIG. 1 is a block diagram of an example of an electronic device in accordance with the present disclosure.

A block diagram of an example of an electronic device 100 is shown in FIG. 1. The electronic device 100 includes multiple components, such as a processor 102 that controls the overall operation of the electronic device 100. The electronic device 100 optionally includes a communications subsystem 104 and a short-range communications 132 module to perform various communication functions, including data and voice communications. Data received by the electronic device 100 is decompressed and decrypted by a decoder 106. The communications subsystem 104 receives messages from and sends messages to a wireless network 150. The wireless network 150 is any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 is coupled to and interacts with other components, such as Random Access Memory (RAM) 108, memory 110, a display 112. In the example embodiment of FIG. 1, the display 112 is coupled to a touch-sensitive overlay 114 and an electronic controller 116 that together comprise a touch-sensitive display 118. The processor is also coupled to one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on an electronic device, is displayed on the touch-sensitive display 118 via the processor 102. The processor 102 optionally interacts with an orientation sensor such as an accelerometer 136 to detect direction of gravitational forces or gravity-induced reaction forces so as to determine, for example, the orientation of the electronic device 100. The processor 102 is optionally coupled to a GPS module 152, which allows the processor 102 to determine the geographical location of the electronic device 100.

To identify a subscriber for network access, the electronic device 100 uses a Subscriber Identity Module or a Removable User Identity Module (SIM/RUIM) card 138 for communication with a network, such as the wireless network 150. Alternatively, user identification information is programmed into memory 110.

The electronic device 100 includes an operating system 146 and software programs or components 148 that are executed by the processor 102 and are typically stored in a persistent, updatable store such as the memory 110. In some example embodiments, additional applications or programs are loaded onto the electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communications subsystem 104 and input to the processor 102. The processor 102 processes the received signal for output to the display 112 and/or to the auxiliary I/O subsystem 124. A subscriber generates data items, for example e-mail messages, which are transmitted over the wireless network 150 through the communications subsystem 104, for example.

Figure 2:
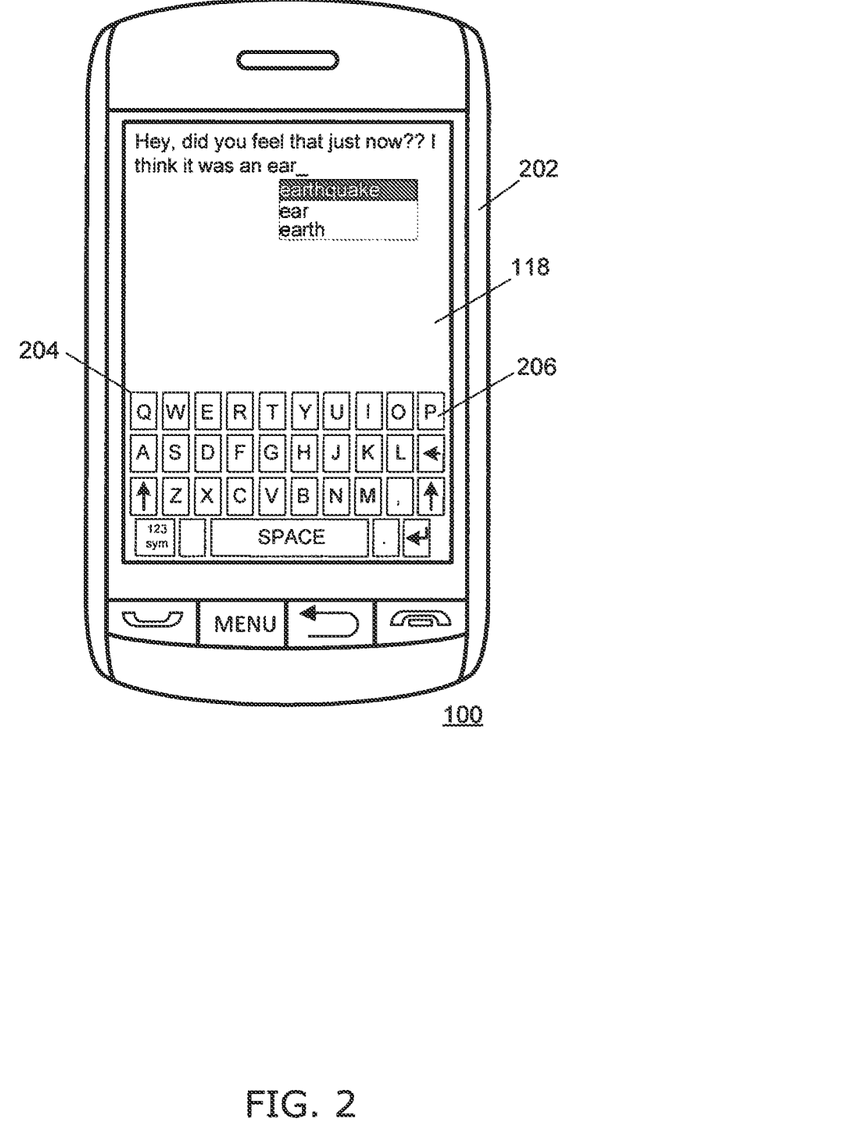
FIG. 2 is a front views of an example of an electronic device having a display and a text message rendered on the display in accordance with the present disclosure.

A front view of an example of the electronic device 100 is shown in FIG. 2. The electronic device 100 includes a housing 202 in which the touch-sensitive display 118 is disposed. The housing 202 is an enclosure that contains components of the electronic device 100, such as the components shown in FIG. 1.

A keyboard 204 may be a physical keyboard within the housing 202, or a virtual keyboard rendered as a GUI displayed on the touch-sensitive display 118 as illustrated by the example embodiment of FIG. 2. The keyboard 204 may be rendered in any program or application suitable to accept input texts from a user, such as a web browser, text messaging, instant messenger, email, social network applications, contacts, calendar, music player, spreadsheet, word processing, operating system interface, and so forth. Other information such as text, characters, symbols, images, and other items may also be displayed, for example, as the keyboard 204 is utilized for data entry.

Figure 3:
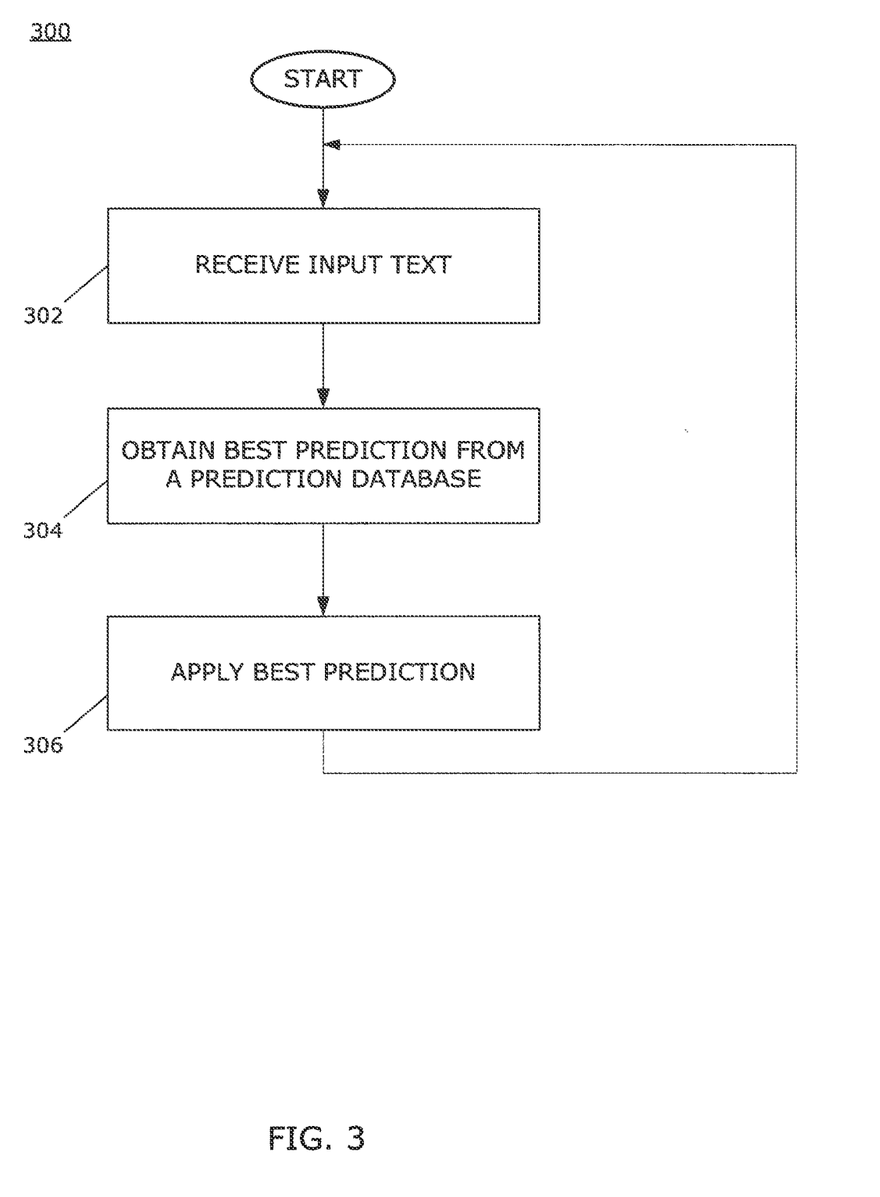
FIG. 3 is a flowchart illustrating a method of text prediction in accordance with the present disclosure.
Figure 4:
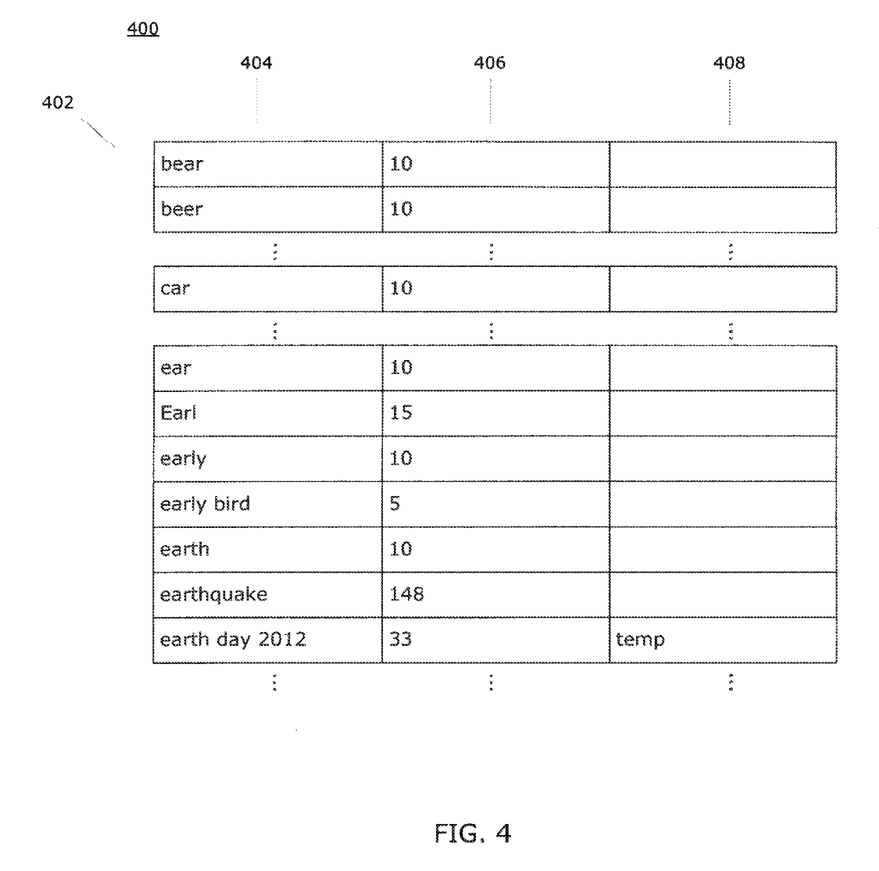
FIG. 4 is a block diagram of an example of a prediction database in accordance with the present disclosure.

FIG. 3 shows a flowchart of an example embodiment of a text prediction process 300, performed by the processor 102. The processor 102 receives at 302 a new input text, for example, the last partial word "ear" from the text message 208 illustrated in FIG. 2. The processor 102 accesses a prediction database 400, described in detail below, and selects among all the text objects included in the prediction database 400 the best prediction, i.e., the text object that would best predict which word the user intends to type. For example, the processor 102 may decide that the best prediction for the partial word "ear" is "earthquake." Other candidates include "ear", "early", "Earl", "earth", "bear", "car" and so forth. The text objects included in the prediction database 400 are not limited to single words, and may include phrases, expressions (e.g., "early bird"), full sentences, etc.

Once the best prediction is obtained at 304, the processor 102 may apply it at 306 in a variety of ways. For example, the processor 102 may automatically replace the input text (e.g., "ear") with the best prediction (e.g., "earthquake"), thereby increasing the effective speed of text entry and/or correcting grammar or spelling mistakes. As another example, the processor 102 may display the best prediction at a predefined location on the touch-sensitive display 118, allowing the user to decide whether to replace the original input with the displayed prediction. In another example embodiment, the processor 102 obtains at 304 several top predictions, and displays at 306 all top predictions, allowing the user to choose which prediction to use for the replacement.

An example embodiment of a prediction database 400 is illustrated in FIG. 4. The prediction database 400 includes entries 402, each entry comprising the following fields: text object 404, weight 406 (optional) and flags 408 (optional). The text objects 404 may include single words (e.g., "Pi"), numbers (e.g., "3.14159265"), symbols (e.g., "π"), phrases or expressions (e.g., "Pi number"), and so forth. In one example embodiment, the weight 406 of each entry 402 is initialized to default values. Default values may be fixed or they may differ depending, for example, on the type of the text object. For example, as illustrated in FIG. 4, nouns (e.g., "car") may have a default value of 10, multi-word expressions (e.g., "early bird") may have a default value of 5, and words beginning with a capital letter (e.g., "Earl") may have a default value of 15.

Prediction database 400 may be stored in memory 110 of the electronic device 100. For faster access, the processor 102 may load the prediction database 400 or parts thereof into RAM 108. In some example embodiments, the prediction database 400 is stored on the network 150 and is partially or fully downloaded into the memory 110 on demand. In other example embodiments, some parts of the prediction database 400 are stored on the network 150 and may be shared by other electronic devices, while the rest of the prediction database 400 is not shared and is stored locally within the memory 110 of the electronic device 100.

In an example embodiment, the processor 102 selects the best prediction among all the text objects 404 by scoring each text object 404 based on its similarity to the input text and based on the weight associated with the text object 404. Similarity of two text objects can be assessed using any suitable algorithm, such as the Levenshtein distance algorithm. Once similarity for a given text object 404 is established, the processor 102 calculates a score that is based on both the level of similarity and the weight of the text object 404. The calculation formula can be any formula that considers at least the above two factors.

In the following example, the input text is "ear"; the three text objects 404 being scored are "ear", "earth" and "earthquake"; their respective similarities are 12, 5 and 4 ("ear" being the most similar and "earthquake" being the least similar among the three); their respective weights are 10, 10 and 148; and the scoring formula is: score=2*(similarity)^2+0.5*(weight).

The score results in the above example are, then:

Score("ear", "ear")=0.3*12^2+0.5*10=48.5

Score("ear", "earth")=0.3*5^2+0.5*10=12.5

Score("ear", "earthquake")=0.3*4^2+0.5*148=78.5

Since the entry "earthquake" received the highest score, it is selected as the best prediction for the input text "ear".

In some example embodiments, the processor 102 considers other factors in addition to or in place of the similarity factor. For example, the processor 102 scores an entry within the prediction database 400 based on how well the entry fits into the text overall text message, for example, grammatically or contextually.

Figure 5:
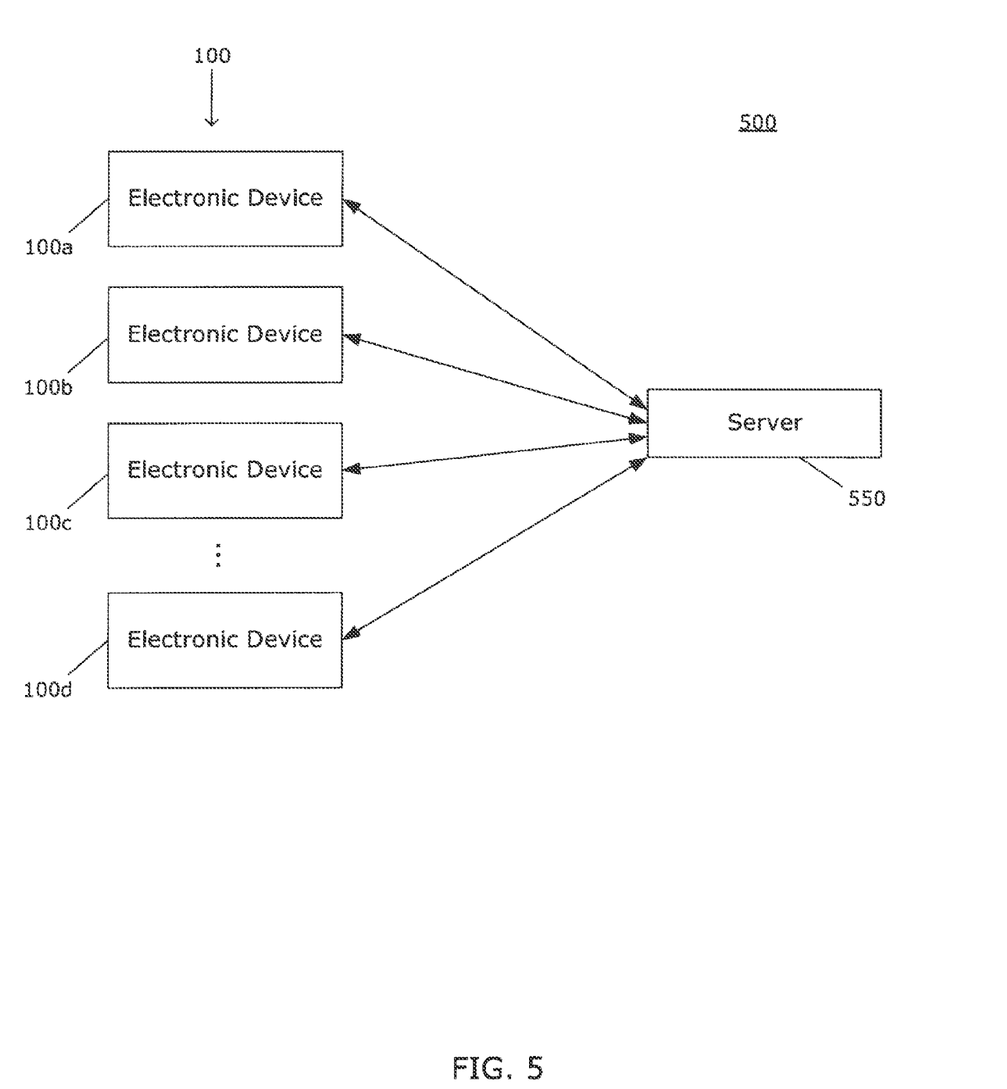
FIG. 5 is a block diagram of an example of a network having a plurality of electronic devices in accordance with the present disclosure.

FIG. 5 illustrates an example embodiment of a device network 500 that includes a set of electronic devices 100, where each device is coupled to a server 550 through any suitable communication means. The electronic devices 100 are not limited to the same type of device and may include laptops, cellular phones, tablet computers, and so forth.

Figure 6:
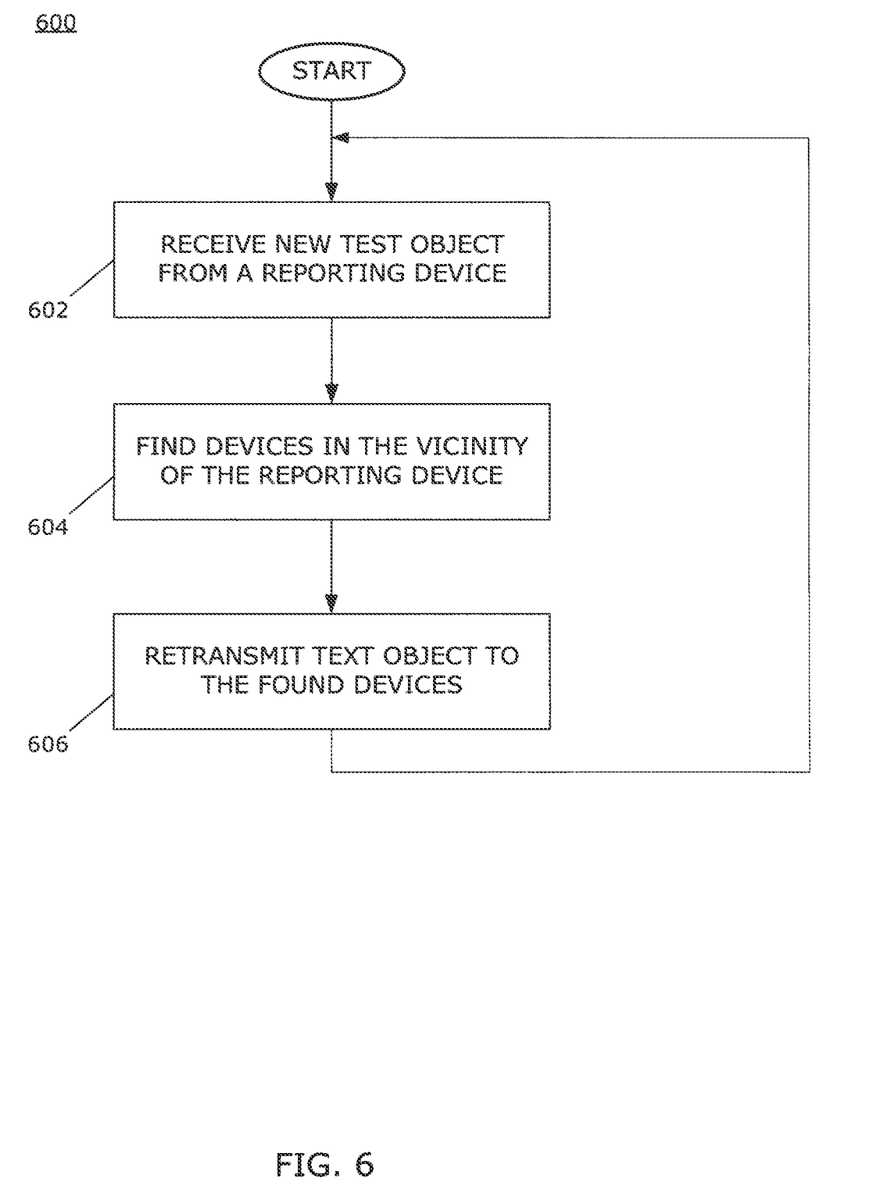
FIG. 6 is a flowchart illustrating a method of text object distribution in accordance with the present disclosure.

The server 550 is a device or a number of devices, capable of performing the text object distribution process 600 described below. For example, the server can be a personal computer, a proprietary server such as the BlackBerry Messenger (BBM), etc. In some examples, the functionality of the server 550 is distributed among the set of electronic devices 100 within the device network 550.

In an example embodiment, an electronic device 100 within the device network 500 receives an input text from a user and reports the input text to the server 550. The server 550 then identifies all the electronic devices 100 located in the vicinity of the reporting electronic device 100, and retransmits the reported input text to such electronic devices 100. Electronic devices 100, upon receiving the retransmitted input text, update their respective prediction dictionaries based on it.

Referring to the example embodiment illustrated in FIG. 5, electronic devices 100a, 100b and 100c are located in San Francisco, Calif., within one mile of each other, and an electronic device 100d is located in San Jose, Calif., about fifty miles away from San Francisco, Calif. When the user of the electronic device 100b enters an input text into any application suitable to receive input texts, the electronic device 100b optionally replaces the input text with a predicted text and reports a corresponding text object to the server 550. Server 550 then determines, for example, that electronic devices 100a and 100c are located within the vicinity of the electronic device 100b, while the electronic device 100d is not. The server 550 then retransmits the reported text object to electronic devices 100a and 100c, but not to 100d.

In some example embodiments, an electronic device 100 within the device network 500 may be configured to a) report its input texts to the server; b) to receive from the server retransmitted text objects originating from electronic devices 100 in its vicinity; c) do both; or d) do neither. Accordingly, some devices may fully participate in the embodiments described herein, some may participate partially, and some may not participate at all.

In an example embodiment, electronic devices 100 are configured whether to report all or only selected text objects, and when to report them. For example, a particular electronic device 100 may be configured (by the user or by the server 550, for example) to report all text messages and social network posts as soon as they are submitted, to report all web-search queries once every minute, and to never report any email messages. In some example embodiments, the information reported to the server includes all text objects within the text message, post, and so forth. In other example embodiments, an electronic device 100 reports only specific kinds of text objects, for example, only nouns, only words beginning with a capital letter, only words that are absent from its prediction database 400, or any combination of the above.

In an example embodiment, the server 550 receives from some or all electronic devices 100 within the device network 500 their geographical locations. An electronic device may determine its geographical location using the GPS module 152, or using techniques such as triangulation, trilateration or multilateration. The server 550 polls the electronic devices 100 requesting their locations periodically and/or when required.

FIG. 6 illustrates an example embodiment of text object distribution process 600 performed by the server 550. The server 550 monitors communications from the devices 100 within the device network 500. When one of the devices 100 receives an input text from its user, the device optionally performs the text prediction process 300 described above and obtains the best prediction. The device then reports a text object corresponding to either the original input text or the obtained best prediction to the server 550. The server 550 receives at 602 a new text object from the reporting device at 602.

The server 550 then finds at 604 electronic devices 100 within the device network 500 that are located in the vicinity of the reporting electronic device 100. First, the server 550 determines the geographical locations of the devices 100. Next, the server 550 determines which electronic devices 100 are located within a predefined distance from the reporting electronic device 100. Predefined distances may be very short (e.g., 100 feet) or very long (e.g., 1000 miles), depending on the application and the desired effect.

Upon determining all electronic devices 100 that are located within a predetermined distance from the reporting electronic device 100, the server 550 retransmits at 606 the text object to the determined devices and returns to 602 to wait for new reported text objects.

In some example embodiments, in an attempt to save bandwidth, the server 550 does not immediately retransmit every reported text object. Instead, it transmits a reported text object only if the text object has been reported several times within a short period of time, and originated from the same geographic area. For example, the server 505 retransmits every tenth occurrence of the same text object, and only if all ten occurred within the last hour and originated from devices 100 located within one mile of each other.

In some example embodiments, instead of a fixed predetermined distance, the processor 102 uses a floating distance to determine which electronic devices 100 will receive the retransmitted text object. The floating distance changes, for example, based on the popularity of the specific text object. For example, for text objects that reoccur with very high frequency, the processor 102 increases the distance and retransmits that text object to a larger number of electronic devices 100.

Figure 7:
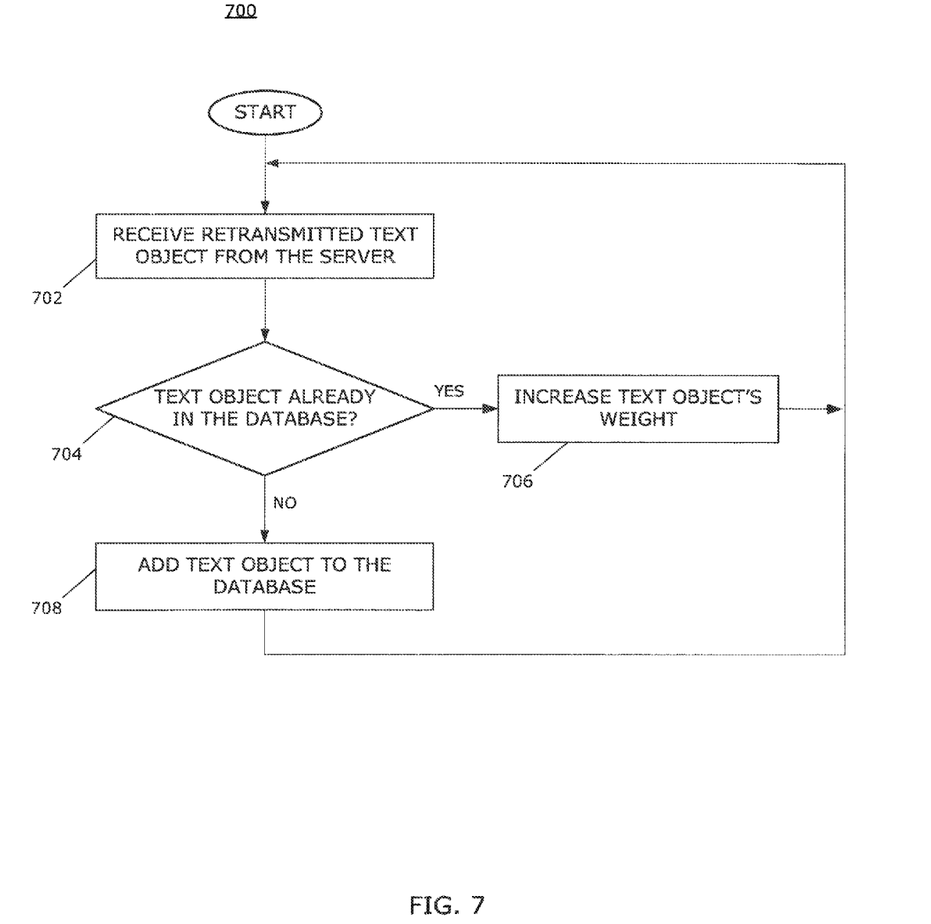
FIG. 7 is a flowchart illustrating a method of updating a prediction database in accordance with the present disclosure.

A flowchart in FIG. 7 illustrates an example embodiment of a database update method 700 performed by a processor 102 of an electronic device 100. The processor 102 receives at 702 a retransmitted text object from the server 550. At 704 the processor 102 determines whether the prediction database 400 of the electronic device 100 already contains a text object that corresponds to the retransmitted text object. If the answer is yes, the processor 102 proceeds to 706 where it increases the weight of that text object in the prediction database 400 by updating its weight field 406. Weights may be increased by a certain number, certain percentage, or using any other formula, such as a limit, beyond which the weight will not be increased.

After increasing the weight of the text object at 706, the processor 102 returns to 702 and waits for new retransmitted text objects from the server 550. If the processor 102 determines at 704 that the prediction database 400 does not contain the retransmitted text object, the processor 102 proceeds to 708 and adds the retransmitted text object to the prediction database 400. In an example embodiment, the processor 102 sets the weight of the new entry at a default value, and sets a flag "temp" in the entry's flags field 408, indicating that the new entry is a temporary one. The processor 102 then returns to 702 and waits for new retransmitted text objects from the server 550.

Increasing a text object's weight results in increasing the probability that the text object, if considered by the processor 102 during the prediction process 300, will emerge as the best prediction. Therefore, the more frequently devices in the vicinity of a given device report a specific text object, the more times the weight of that text object is increased in the given device's prediction database 400, and the higher the probability that the processor 102 will use that text object for prediction. For example, a user named Sam is working in his office in downtown San Francisco, Calif., when he experiences a possible earthquake. He wants to share and confirm that information with a friend who works nearby, and writes him a text message 208, illustrated in FIG. 2. As Sam completes the first three letters of the word "earthquake", the processor 102 runs the prediction process 300, described above.

If one scenario, several other users located near Sam have also experienced this earthquake and have already submitted text messages, emails, or social network posts, where they included the text object "earthquake." In this scenario, the prediction database 400 of Sam's electronic device 100 already reflects the unusually frequent occurrence of the text object "earthquake" and its weight has been increased from 10 (default) to 148, for example. Consequently, prediction process 300, upon scoring the different text objects within the prediction database 400, determines that the best prediction for the input text "ear" is "earthquake".

In another scenario, Sam is the first user in his vicinity to report the text object "earthquake". In this scenario, the prediction process 300 determines that the best prediction is "ear", because "earthquake" has still a default weight of 10, and "ear" is closer than "earthquake" in terms of similarity". However, once Sam overrides the incorrect prediction offered by the prediction process 300 and sends a text message with the word "earthquake" in it, all electronic devices 100 in his vicinity increase the weight of "earthquake" in their prediction dictionaries 400. In an embodiment, the prediction database 400 of Sam's own electronic device 100 is also updated to increase the weight of "earthquake".

Notably, devices in a remote location A are not affected by input texts reported from location B, even if the contents of those input texts are directly associated with the remote location A. For example, if Los Angeles Lakers are playing in Sacramento, Calif., there will be many input texts with the text objects "Los Angeles" or "LA" originating from Sacramento, Calif. Such input texts will still only affect the prediction dictionaries of electronic devices located in the vicinity of Sacramento and will not affect the prediction dictionaries of electronic devices located in any other region, including Los Angeles, Calif.

Figure 8:
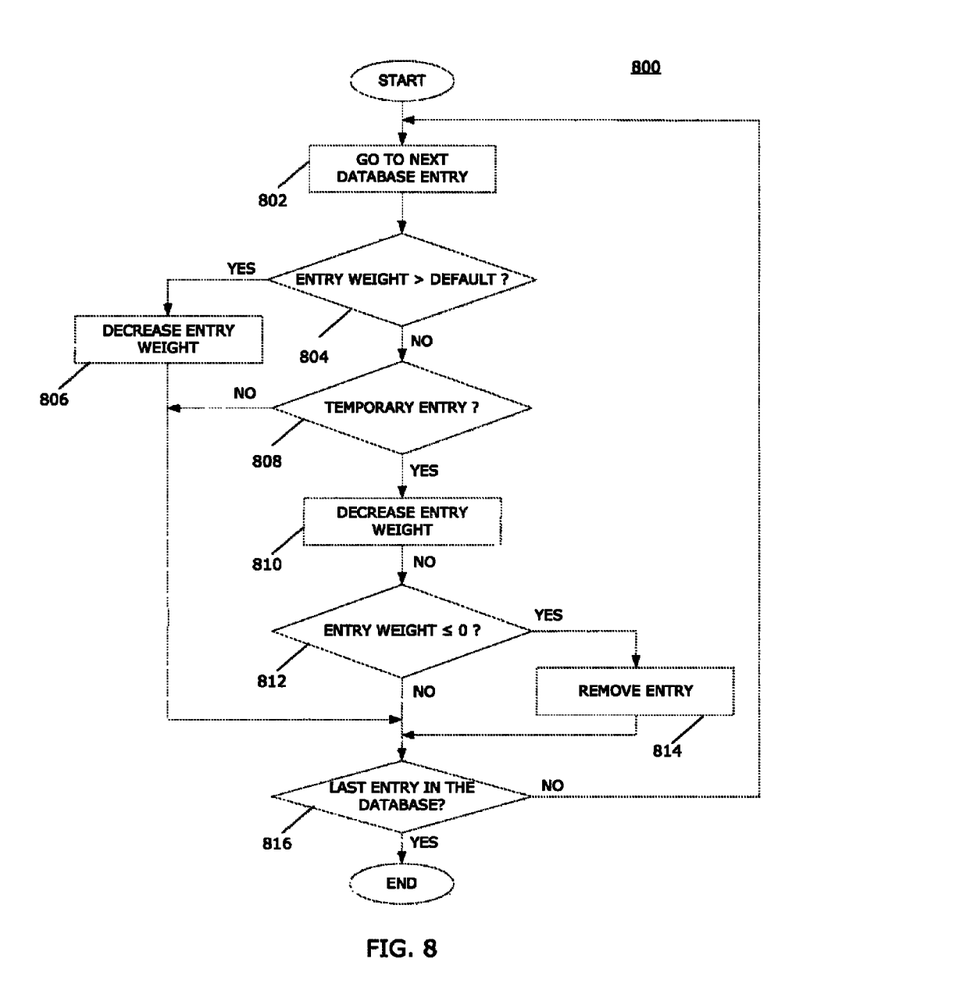
FIG. 8 is a flowchart illustrating a method of an amortization process in accordance with the present disclosure.

FIG. 8 illustrates an amortization process 800, in accordance to an example embodiment. The processor 102 runs the amortization process 800 periodically, at fixed time intervals (e.g., once every 10 minutes). At 802, the processor 102 accesses an entry 402 of the prediction database 400. It checks at 804 whether the weight field 406 of the entry 402 is higher than the default weight value for that field. If so, the processor 102 decreases the value of the weight field 406 at 806, and proceeds to 816. The value may be decreased by a constant amount, a constant percentage, or using any other suitable formula. In an example embodiment, the value is not decreased below the default value, unless the entry 402 is a temporary one.

If the processor 102 determines at 804 that the weight is already equal or rower than the default value, it determines at 808 whether this entry is a temporary one, that is, whether its flags field 408 includes the flag "temp". If the entry is not a temporary one, the processor 102 continues to 816. Otherwise, the processor 102 decreases the value of the weight field 406 by a constant amount, a constant percentage, or using any other suitable formula. Next, the processor 102 checks at 812 whether the new weight value is zero or lower, and if so it removes the entry 402 from the prediction database 400 at 814. Otherwise, it continues to 816. At 816 the processor 102 determines whether this was the last entry in the prediction database 400. If not, the processor 102 returns to process the next entry at 802; otherwise, the amortization process 800 ends.

The result of periodically running the amortization process 800 is gradually returning to default weight values text objects that were heavily reported but then stopped being reported. Furthermore, text objects that were not originally in the prediction database 400 and were therefore marked as temporary, will be removed from the prediction database 400 as a result of this process, shortly after their reporting stops. The following examples illustrate these phenomena.

Referring back to FIG. 4, the text object "earthquake" was initiated to a weight of 10, the default weight for nouns, according to an example. After the earthquake has occurred, the text object was reported, for example, fifteen times by electronic devices 100 within the vicinity of the electronic device 100, with each time increasing its weight by 10 points, resulting in the total weight of 160. Then there were no additional reports of the text object. Every ten minutes the processor 102 runs the amortization process 800, decreasing the text object's weight each time, for example, by 12. Thus, after one run of the process 800, the weight of the text object "earthquake" is at 148, as illustrated in FIG. 4. The weight will keep decreasing every ten minutes until it reaches its default value of 10 points.

In another example, users in the vicinity of an event dedicated to the Earth Day of 2012 are reporting the text object "Earth Day 2012" to the server 550 through using it in their input texts. Samantha is approaching the location of the event and her electronic device 100 starts receiving the retranslated text object "Earth Day 2012". The first time the text object is received by her electronic device 100, it will be added to the prediction database 400 with a weight of 5 (a default weight for multi-word phrases, according to an example) and with a "temp" flag, because the text object did not originally exist in the prediction database 400. Samantha's device then quickly receives the same text object ten more times, each time increasing its weight by 10 and resulting in the total weight of 105. Samantha keeps walking and at some, point she effectively "walks out" of the vicinity zone of the event, so her electronic device 100 stops getting the text object "Earth Day 2012" (even if it is still reported by electronic devices 100 close to the event). Within the next hour, Samantha's electronic device 100 runs the weight amortization process 800 six times, each time decreasing the text object's weight by 12, resulting in a weight of 105−6*12=33, as illustrated in FIG. 4. After thirty more minutes, the weight will be decreased three more times, bringing the weight to −3, which results in a removal of the temporary text object "Earth Day 2012" from the database 400.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method of predicting an input object in a first electronic device coupled to a prediction database comprising a plurality of prediction objects, the method comprising:
   receiving, by a second electronic device, a second text object;
   determining whether the first electronic device is associated with the second electronic device based on a distance separating the first and the second electronic devices being shorter than a predefined distance;
   if the first electronic device is associated with the second electronic device, updating the prediction database based on the second text object;
   receiving, by the first electronic device, a first text object;
   selecting, by the first electronic device, an output text object from the plurality of prediction objects; and
   outputting, by the first electronic device, the output text object selected from the plurality of the prediction objects.

2. The method of claim 1, further comprising presenting, by the first electronic device, the output text object selected from the plurality of the prediction objects.

3. The method of claim 1, wherein each of the plurality of prediction objects is associated with a weight, and selecting the output text object based at least in part on the weights.

4. The method of claim 3, wherein updating the prediction database comprises finding within the plurality of prediction objects a prediction object associated with the second text object and increasing the weight associated with the prediction object.

5. The method of claim 4, further comprising periodically decreasing weights associated with each of the plurality of prediction objects.

6. The method of claim 1, wherein determining whether the first electronic device is associated with the second electronic device is performed by a server coupled to the first electronic device and the second electronic device, the server configured to receive the second text object from the second electronic device and transmit the second text object to the first electronic device.

7. A system comprising:
   a first electronic device associated with a prediction database comprising a plurality of prediction objects, the first electronic device comprising a processor configured to:
      receive a first text object,
      receive a second text object from a server, wherein the second text object is received by the server from a second electronic device coupled to the server and retransmitted by the server to the first electronic device if a distance separating the first and the second electronic devices is shorter than a predefined distance,
      update the prediction database based on the second object, and output an output text object selected from the plurality of prediction objects.

8. The system of claim 7, wherein each of the plurality of prediction objects is associated with a weight, and the processor is configured to select the output text object based at least in part on the weights.

9. The system of claim 8, wherein the processor is further configured to find within the plurality of prediction objects a prediction object associated with the second text object and increase the weight associated with the found prediction object.

10. The system of claim 9, wherein the processor is further configured to periodically decrease weights associated with each of the plurality of prediction objects.

11. The system of claim 7, wherein the processor is further configured to display the output text object selected from the plurality of prediction objects.

12. A server communicatively coupled to a first electronic device and a second electronic device, the server comprising a processor configured to:
   receive a second text object from the second electronic device;
   determine whether a distance separating the first and the second electronic devices is shorter than a predefined distance;
   based on the determination, transmit the second text object to the first electronic device, wherein the first electronic device is associated with a prediction database comprising a plurality of prediction objects, wherein the prediction database is updated based on the second text object.

13. The server of claim 12, wherein the first electronic device is configured to:
   receive a first text object;
   select an output text object from the plurality of prediction objects; and
   output the output text object selected from the plurality of prediction objects.

14. The server of claim 13, wherein each of the plurality of prediction objects is associated with a weight, and the first electronic device is configured to select the output text object based at least in part on the weights.

15. The server of claim 14, wherein the first electronic device is further configured to find within the plurality of prediction objects a prediction object associated with the second text object and increase the weight associated with the found prediction object.

16. The server of claim 15, wherein the first electronic device is further configured to periodically decrease weights associated with each of the plurality of prediction objects.

* * * * *